Figure 1:
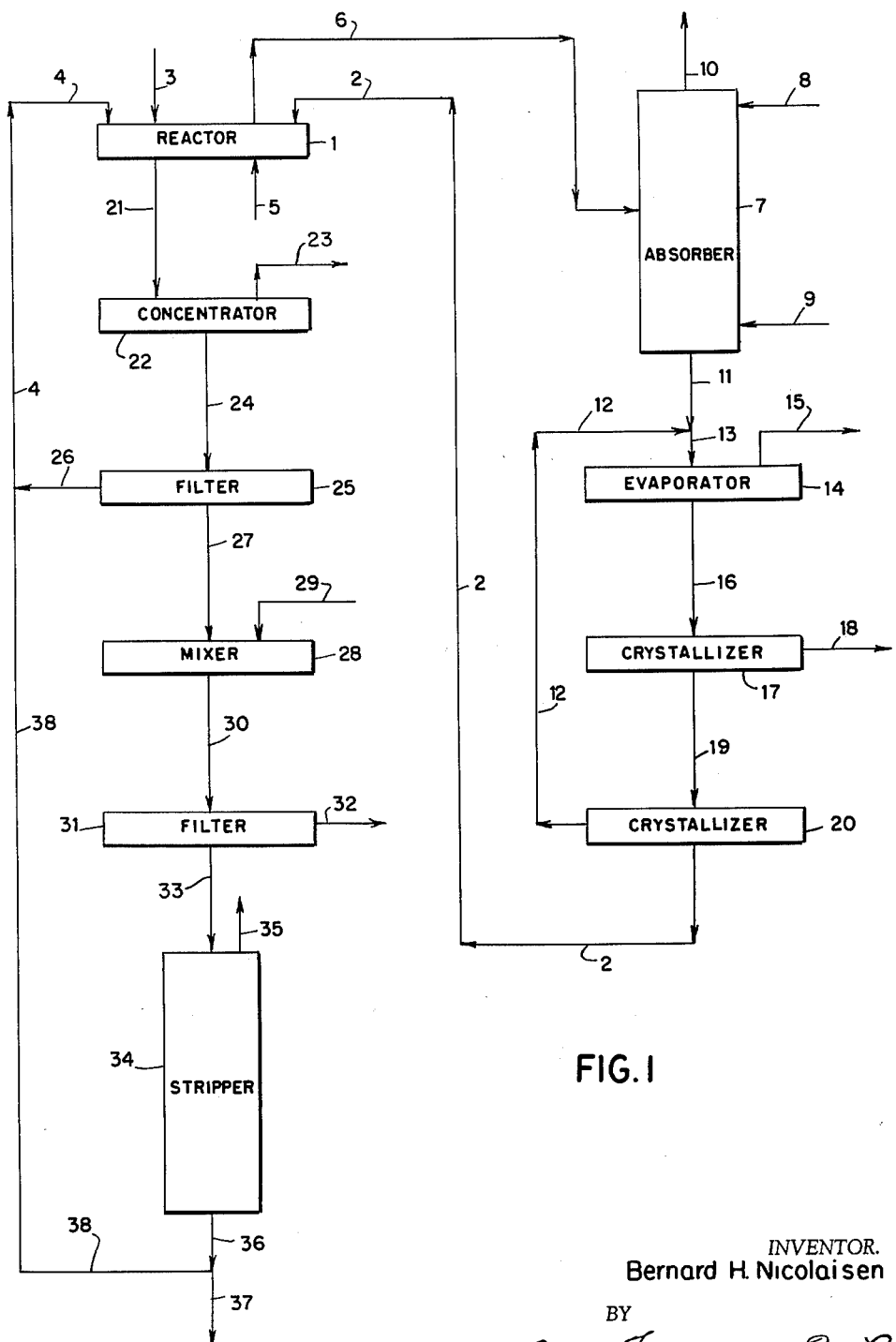

Oct. 2, 1962  B. H. NICOLAISEN  3,056,656
PRODUCTION OF AQUEOUS PERCHLORIC ACID
Filed May 20, 1958  2 Sheets-Sheet 1

FIG. I

INVENTOR.
Bernard H. Nicolaisen
BY
ATTORNEYS

INVENTOR.
Bernard H. Nicolaisen

United States Patent Office 3,056,656
Patented Oct. 2, 1962

3,056,656
PRODUCTION OF AQUEOUS PERCHLORIC ACID
Bernard H. Nicolaisen, Kenmore, N.Y., assignor to Olin Mathieson Chemical Corporation, a corporation of Virginia
Filed May 20, 1958, Ser. No. 737,187
4 Claims. (Cl. 23—152)

This invention relates to a process for the production of perchloric acid and more particularly relates to a process in which the ultimate reagents used can be only caustic, chlorine and hydrogen chloride.

It is known in the prior art that acidified chlorate solutions containing chloric acid can be oxidized, for example, by means of lead dioxide to form perchloric acid. However, the necessity of recovering, reoxidizing and recycling lead compounds is an inherent disadvantage of that process. Handling the solids introduces mechanical problems. Some loss of lead compounds cannot be avoided and there is also loss of the desired product in the lead residues. These disadvantages, all taken together, are burdens on the process.

The process of the present invention comprises several steps, in the first of which recycle sodium chlorate is acidified by means of recycle perchloric acid to produce chlorine dioxide and sodium perchlorate. An intramolecular oxidation and reduction or disproportionation occurs which proceeds according to the following equation:

(1) $3NaClO_3 + 2HClO_4 \rightarrow 2ClO_2 + 3NaClO_4 + H_2O$

Chemically pure or commercial sodium chlorate containing minor proportions of sodium chloride can be employed in the first step along with the recycle sodium chlorate. Small amounts of sodium chloride may be contained in the recycle perchloric acid. Such chloride, as well as sodium chloride present in such commercial chlorate as is used, is oxidized in the disproportionation reactor by sodium chlorate or chloric acid generated therefrom according to the following equation:

(2) $NaCl + NaClO_3 + 2HClO_4$
$\rightarrow ClO_2 + \frac{1}{2}Cl_2 + 2NaClO_4 + H_2O$ The chlorine and chlorine dioxide gases from the reaction zone are swept out, for example, by a stream of air. Suitable proportions of air or other inert diluent gas are introduced into the reactor in order to maintain the chlorine dioxide concentration below a point at which any explosion hazard exists. The chlorine dioxide-containing stream from the reactor should not contain more than about 35 percent by weight of chlorine dioxide at 70° C. to prevent explosive decomposition.

In the second step the mixed chlorine and chlorine dioxide gases, while still diluted with air or other inert diluent gas, are absorbed in an excess of aqueous caustic. The following reactions take place in the caustic absorber:

(3) $2ClO_2 + 2NaOH \rightarrow NaClO_3 + NaClO_2 + H_2O$ (4) $2NaOH + Cl_2 \rightarrow NaOCl + NaCl + H_2O$ In a third step the solution of sodium hydroxide, sodium hypochlorite, sodium chlorite and sodium chlorate is treated at an elevated temperature with sufficient chlorine to react with the excess of sodium hydroxide. The chlorine, forming sodium hypochlorite as an intermediate, oxidizes the sodium chlorite in the solution to sodium chlorate according to the following equation:

(5) $NaClO_2 + 2NaOH + Cl_2 \rightarrow NaClO_3 + 2NaCl + H_2O$

If additional amounts of caustic and chlorine are introduced they react in the aqueous solution at elevated temperatures to form additional sodium chlorate:

(6) $6NaOH + 3Cl_2 \rightarrow NaClO_3 + 5NaCl + 3H_2O$

In this way sufficient chlorate can be prepared for charging the disproportionation reactor (first step) without the necessity of supplying sodium chlorate from an electrolytic or other external source.

The second and third steps are advantageously combined in a single operation in which aqueous caustic is charged to the top of a scrubber. The chlorine-chlorine dioxide mixture from the disproportionation reactor and additional chlorine are introduced at the bottom of the tower.

The solution of sodium chlorate and sodium chloride resulting from the third step or from the combined operation is concentrated by evaporation and sodium chloride is removed by crystallization. Sodium chlorate is crystallized from the residual solution and is returned to the first step of disproportionation. The mother liquor can be recycled to the concentration step following the caustic absorber and chlorinating tower.

The sodium perchlorate solution effluent from the disproportionation reactor is concentrated and then cooled to precipitate sodium perchlorate. The perchloric liquor is recycled to the disproportionation reactor. The precipitated sodium perchlorate is reacted with concentrated hydrochloric acid solution to precipitate sodium chloride. The acid mother liquid is stripped of residual hydrochloric acid by any suitable means, for example, distillation, passage of a stream of air through the solution, or otherwise. A portion of the resulting perchloric acid is recycled to the disproportionation reactor and part of it is removed as product. It is suitable for use for the preparation of salts by neutralization or for any other purpose.

The process of the present invention eliminates entirely the difficulties in using lead dioxide as oxidizing agent. It is ideally suited to the use of dilute chlorine-containing streams, for example, from the Deacon oxidation of hydrogen chloride. The hydrogen chloride used can be derived from any suitable source, for example, as a by-product of salt cake manufacture using salt and sulfuric acid or by the dissociation and separation of ammonium chloride in known ways. It should preferably be free from organic contaminants.

*Example I*

In this example a portion of the sodium chlorate charged to the reactor is obtained from an outside source. The flow sheet for the process of this example is shown in FIGURE 1. The quantities used in this example are expressed in pound moles per hour.

The reactor 1 is charged by means of line 2 with 2 moles of recycle sodium chlorate and by means of line 3 with one mole of fresh sodium chlorate. In addition, into reactor 1 by means of line 4 there is introduced 10 moles of perchloric acid, 37.2 moles of water and 0.595 mole of sodium perchlorate. Reaction 1 is maintained at 80° C. and through line 5, 9 moles of air is introduced. A chlorine dioxide-air mixture is produced in reactor 1, so that through line 6 there passes 2 moles of chlorine dioxide and 9 moles of air.

The chlorine dioxide-air mixture passing through line 6 is introduced into the bottom of absorber 7, into the top of which through line 8 there is introduced 4 moles of sodium hydroxide and 35.6 moles of water and into the bottom of which through line 9 there is introduced one mole of chlorine. Absorber 7 is maintained at a temperature of 60° C. The scrubbed air is discharged from the top of absorber 7 through line 10, and from the bottom of absorber 7 through line 11 there passes 2 moles of sodium chlorate, 2 moles of sodium chloride and 37.6 of water. The mixture passing through line 11 is combined with recycle material passing through line 12 composed of 3.72 moles of sodium chlorate, 1.70 moles of sodium chloride and 30.6 moles of water, and the entire mixture then passes by means of line 13 into evaporator 14. In evaporator 14, the mixture is concentrated by boiling down to provide a mixture containing 40 percent by weight of water, 37.6 percent by weight being removed by means of line 15.

The concentrated mixture passes from evaporator 14 by means of line 16 into crystallizer 17, which is maintained at 80° C. From the crystallizer 17, 2 moles of solid sodium chloride is removed by means of line 18, so that from crystallizer 17 through line 19 there passes a mixture of 5.72 moles of sodium chlorate, 1.70 moles of sodium chloride and 30.6 moles of water. In crystallizer 20, the mixture is further cooled to 25° C. in order to crystallize 2 moles of sodium chlorate which passes by means of line 2 into reactor 1. From crystallizer 20, mother liquor composed of 3.72 moles of sodium chlorate, 1.70 moles of sodium chloride and 30.6 moles of water passes by means of lines 12 and 13 into evaporator 14.

The aqueous slurry effluent from reactor 1 comprises 8 moles of perchloric acid, 3.60 moles of sodium perchlorate and 38.2 moles of water and passes by means of line 21 into concentrator 22 wherein 8.40 moles of water vapor are removed by means of line 23. The concentrated mixture is then introduced by means of line 24 into filter 25. From filter 25 there is removed through line 26 a mother liquid comprising 8 moles of perchloric acid, 0.49 mole of sodium perchlorate and 29.8 moles of water. The wet filter cake produced in filter 25 contains 3.105 moles of sodium perchlorate and by means of line 27 it is introduced into mixer 28, into which there is also introduced by means of line 29 6.21 moles of hydrogen chloride dissolved in 23.4 moles of water. To insure complete conversion of the sodium perchlorate to sodium chloride and perchloric acid, the mixture is vigorously agitated in mixer 28 at a temperature of 30° C.

From mixer 28 by means of line 30 there is removed a reaction mixture composed of 3.105 moles of perchloric acid, 23.4 moles of water, 3.105 moles of hydrogen chloride and 3.105 moles of sodium chloride. This mixture is passed through filter 31 from which 2.95 moles of solid sodium chloride is removed by means of line 32. The mother liquor from filter 31 is composed of 3.105 moles of perchloric acid, 23.4 moles of water, 3.105 moles of hydrogen chloride and 0.155 mole of sodium chloride. This mother liquor is introduced by means of line 33 into hydrogen chloride stripper 34 which is operated at a temperature of 140° C. Overhead from the stripper through line 35 there is removed a vapor stream composed of 3.26 moles of hydrogen chloride and 12.4 moles of water vapor. This vapor stream can be condensed and reused together with additional hydrochloric acid in mixer 28 if so desired.

From the bottom of stripper 34 through line 36 there flows a stream composed of 2.95 moles of perchloric acid, 10.97 moles of water and 0.155 mole of sodium perchlorate. This stream is split into streams 37 and 38. Through line 37 there passes a product composed of 0.95 mole of perchloric acid, 3.53 moles of water and 0.050 mole of sodium perchlorate. The remainder of the stream passing through line 36 flows through line 38 and 4 into reactor 1. If desired, the stream passing through line 37 can be treated with aqueous sodium hydroxide to convert the perchloric acid present therein to sodium perchlorate and the sodium perchlorate then separated in the conventional manner from the water with which it is in admixture.

*Example II*

Figure 2:
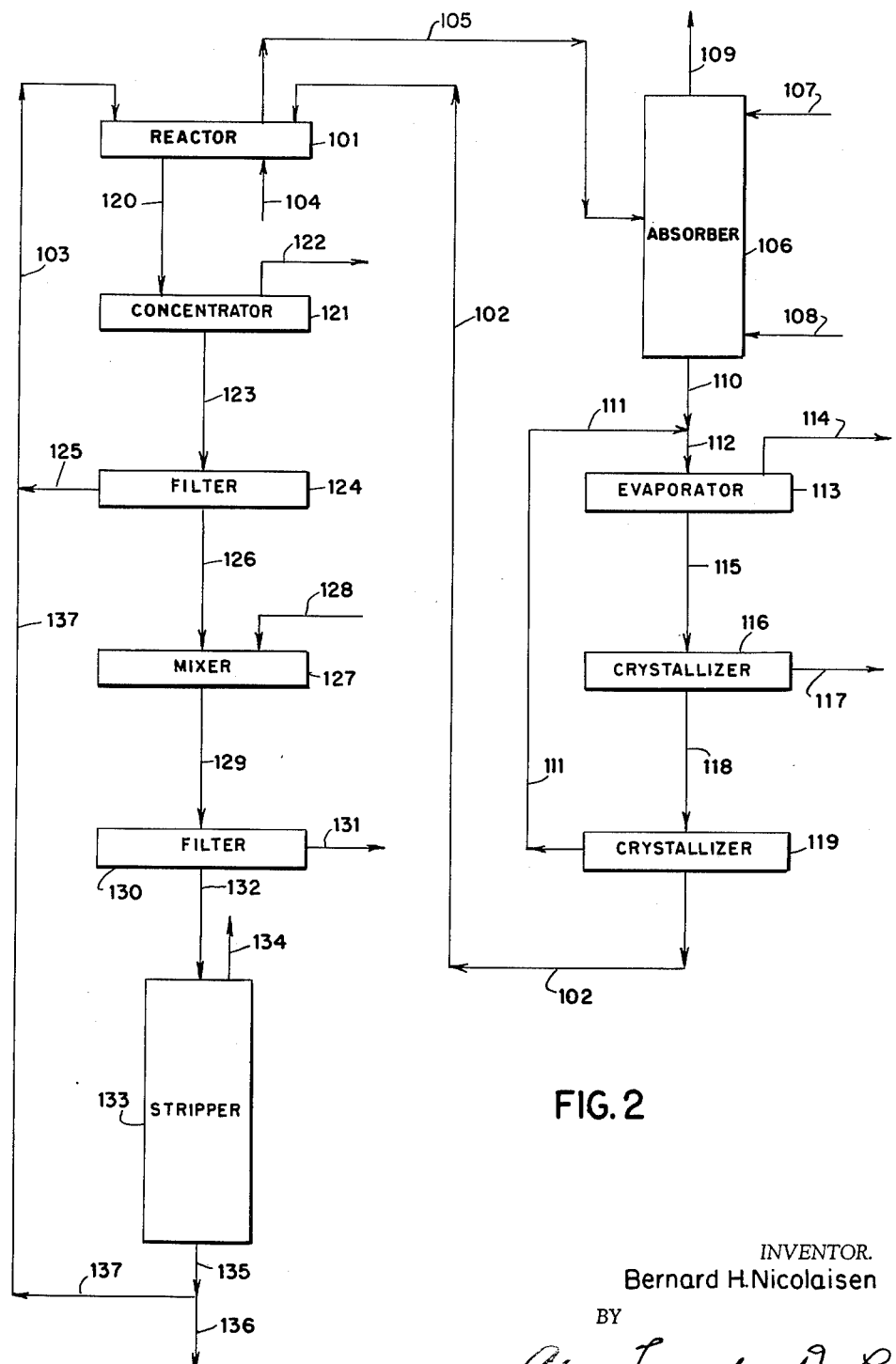

In this example no extraneous source of sodium chlorate is used. All of the required chlorate is generated by the reaction of chlorine and caustic. The flow sheet for the process of this example is shown in FIGURE 2. The quantities used in this example are expressed in pound moles per hour.

The reactor 101 is charged by means of line 102 with 3 moles of recycle sodium chlorate passing through line 102. In addition, into reactor 101 by means of line 103 there is introduced 10 moles of perchloric acid, 37.24 moles of water and 0.595 mole of sodium perchlorate. Reactor 101 is maintained at 95° C., and through line 104, 9 moles of air is introduced. A chlorine dioxide-air mixture is produced in reactor 101, so that through line 105 there passes 2 moles of chlorine dioxide and 9 moles of air.

The chlorine dioxide-air mixture passing through line 105 is introduced into the bottom of absorber 106, into the top of which through line 107 there is introduced 10 moles of sodium hydroxide and 8.90 moles of water and into the bottom of which through line 108 there is introduced 4 moles of chlorine. Absorber 106 is maintained at a temperature of 60° C. The scrubbed air is discharged from the top of absorber 106 through line 109, and from the bottom of absorber 106 through line 110 there passes 3 moles of sodium chlorate, 7 moles of sodium chloride and 92 moles of water. The mixture passing through line 110 is combined with recycle material passing through line 111, composed of 10.3 moles of sodium chlorate, 5.6 moles of sodium chloride and 90 moles of water, and the entire mixture then passes by means of line 112 into evaporator 113. In evaporator 113, the mixture is concentrated by boiling down to provide a mixture containing 40 percent by weight of water, 9.20 moles of water being removed by means of line 114. The concentrated mixture passes from evaporator 113 by means of line 115 into crystallizer 116, which is maintained at 80° C. From the crystallizer 116, 7 moles of solid sodium chloride is removed by means of line 117, so that from crystallizer 116 through line 118 there passes a mixture of 13.3 moles of sodium chlorate, 5.6 moles of sodium chloride and 90 moles of water. In crystallizer 119, the mixture is further cooled to 25° C. in order to crystallize 3 moles of sodium chlorate which pass by means of line 102 to reactor 101. From crystallizer 119, mother liquor composed of 10.3 moles of sodium chlorate, 5.6 moles of sodium chloride and 90 moles of water passes by means of lines 111 and 112 into evaporator 113.

The aqueous slurry effluent from reactor 101 comprises 8 moles of perchloric acid, 3.60 moles of sodium perchlorate and 38.2 moles of water and passes by means of line 120 into concentrator 121 wherein 8.40 moles of water vapor are removed by means of line 122. The concentrated mixture is then introduced by means of line 123 into filter 124. From filter 124 there is removed through line 125 a mother liquor comprising 8 moles of perchloric acid, 0.49 mole of sodium perchlorate and 29.8 moles of water. The wet filter cake produced in filter 124 contains 3.105 moles of sodium perchlorate and by means of line 126 is introduced into mixer 127, into which there is also introduced by means of line 128, 6.21 moles of hydrogen chloride dissolved in 23.4 moles of water. To insure completion of the conversion of the sodium perchlorate to sodium chloride and perchloric acid, the mixture is vigorously agitated in mixer 127 at a temperature of 30° C.

From mixer 127 by means of line 129 there is removed a reaction mixture composed of 3.105 moles of perchloric acid, 23.4 moles of water, 3.105 moles of hydrogen chloride and 3.105 moles of sodium chloride. This mixture is passed through filter 130 from which 2.95 moles of solid sodium chloride are removed by means of line 131. The mother liquor from filter 130 is composed of 3.105 moles of perchloric acid, 23.4 moles of water, 3.105 moles of hydrogen chloride and 0.155 mole of sodium chloride. This mother liquor is introduced by means of line 132 into hydrogen chloride stripper 133 which is operated at a temperature of 140° C. Overhead from the stripper through line 134 there is removed a vapor stream composed of 3.26 moles of hydrogen chloride and 12.4 moles of water vapor. This vapor stream can be condensed and re-used together with additional hydrochloric acid in mixer 127 if desired.

From the bottom of stripper 133 through line 135 there flows a stream composed of 2.95 moles of perchloric acid, 10.97 moles of water and 0.155 mole of sodium perchlorate. This stream is split into streams 136 and 137. Through line 136 there passes a product composed of 0.95 mole of perchloric acid, 3.53 moles of water and 0.050 mole of sodium perchlorate. The remainder of the stream passing through line 135 flows through line 137 and 103 into reactor 101. If desired, the stream passing through line 136 can be treated with aqueous sodium hydroxide to convert the perchloric acid present therein to sodium perchlorate and the sodium perchlorate then separated in the conventional manner from the water with which it is in admixture.

In the first reaction zone, wherein sodium chlorate and perchloric acid are reacted to produce chlorine dioxide, sodium perchlorate and water, and wherein any sodium chloride present is reacted with sodium chlorate and perchloric acid to produce chlorine dioxide, chlorine, sodium perchlorate and water, the reaction temperature employed will generally be within the range from about 70° C. to about 120° C. For each mole of sodium chloride, if any, introduced into the reaction zone, there are introduced approximately one mole of sodium chlorate and at least two moles of perchloric acid, and for each three moles of sodium chlorate introduced into the first reaction zone in addition to this, there is introduced perchloric acid in the minimum additional amount of approximately two moles.

In the second reaction zone, wherein chlorine dioxide is reacted with sodium hydroxide to produce sodium chlorate, sodium chlorite and water and wherein chlorine is reacted with sodium hydroxide to produce sodium hypochlorite, sodium chloride and water, the temperature employed will generally be within the range from about 50° C. to about 80° C. For each mole of chlorine dioxide introduced into the second reaction zone, at least about one mole of sodium hydroxide should be introduced, and for each mole of chlorine introduced in the reaction zone at least about an additional two moles of sodium hydroxide should be introduced. Thus, the minimum amount of sodium hydroxide introduced into the second reaction zone is indicated by Equations 3 and 4. More sodium hydroxide than that stoichiometrically required to consume the chlorine dioxide and chlorine should be introduced, since any excess sodium hydroxide introduced into the second reaction zone will not be consumed but instead will form a part of that required in the third reaction zone.

The third reaction zone, wherein sodium chlorite, sodium hydroxide and chlorine are reacted to form sodium chloride, sodium chlorate and water, wherein sodium hypochlorite, if present, is reacted with sodium hydroxide and chlorine to produce sodium chlorate, sodium chloride and water and wherein excess sodium hydroxide, if present, is reacted with chlorine to produce sodium chlorate, sodium chloride, and water, the reaction temperature will generally be within the range from about 50° C. to about 80° C. In the third reaction zone, 2 moles of sodium hydroxide are introduced per mole of chlorine dioxide introduced into the reaction zone (second). In addition, two moles of sodium hydroxide are introduced per mole of chlorine, if any, introduced into the second reaction zone. Thus, the amount of sodium hydroxide introduced into the third reaction zone should be at least sufficient to consume the sodium chlorite introduced therein, as shown by Equation 5. Additional sodium hydroxide can be introduced, this being consumed by chlorine introduced to form sodium chlorate, sodium chloride and water, as shown by Equation 6.

I claim:

1. A method for the manufacture of aqueous perchloric acid as the sole product which comprises in a first reaction zone reacting sodium chlorate and perchloric acid in aqueous solution to produce an aqueous solution of sodium perchlorate and chlorine dioxide gas; in a second reaction zone absorbing the chlorine dioxide in aqueous sodium hydroxide containing sodium hydroxide in greater molar amount than the moles of chlorine dioxide to form a solution comprising sodium chlorate and sodium chlorite; in a third reaction zone reacting the said solution with chlorine in aqueous admixture to produce an aqueous mixture of sodium chloride and sodium chlorate, removing sodium chloride and sodium chlorate from the reaction mixture, separating the sodium chloride from the sodium chlorate, and recycling the sodium chlorate to the first reaction zone; and reacting the aqueous solution of sodium perchlorate formed in the first reaction zone with hydrogen chloride to produce aqueous perchloric acid and sodium chloride, recycling a portion of the aqueous perchloric acid to the first reaction zone and recovering the remaining aqueous perchloric acid as product.

2. The method of claim 1 wherein the temperature in the first reaction zone is within the range from 70° to 120° C. and the temperature in the second and third reaction zones is within the range from 50° C. to 80° C.

3. A method for the manufacture of aqueous perchloric acid which comprises in a first reaction zone reacting sodium chloride, sodium chlorate and perchloric acid in aqueous solution at a temperature within the range from 70° C. to 120° C. to produce an aqueous solution of sodium perchlorate and an admixture of chlorine gas and chlorine dioxide gas; in a second reaction zone reacting at a temperature within the range from 50° C. to 80° C. the admixture of chlorine gas and chlorine dioxide gas with aqueous sodium hydroxide containing sodium hydroxide in stoichiometric amount to react with the chlorine and chlorine dioxide to produce an aqueous mixture of sodium chloride and sodium chlorate, removing sodium chloride and sodium chlorate from the reaction mixture, separating the sodium chloride from the sodium chlorate, and recycling the sodium chlorate to the first reaction zone; and reacting the aqueous solution of sodium perchlorate formed in the first reaction zone with hydrogen chloride to produce aqueous perchloric acid and sodium chloride, recycling a portion of the aqueous perchloric acid to the first reaction zone, and recovering the remaining aqueous perchloric acid as product.

4. A method for the manufacture of aqueous perchloric acid as the sole product which comprises in a first reaction zone reacting sodium chlorate and perchloric acid in a molar ratio of 3:2 in an aqueous solution to produce an aqueous solution of sodium perchlorate and the stoichiometric two moles of chlorine dioxide gas; in a second reaction zone reacting the two moles of chlorine dioxide and 4 moles of chlorine with aqueous sodium hydroxide containing 10 moles of sodium hydroxide to produce an aqueous mixture containing sodium chloride and three moles of sodium chlorate, removing the sodium chloride and sodium chlorate from the reaction mixture, separating the sodium chloride from the sodium chlorate, and recycling the three moles of sodium chlorate to the first reaction zone; and reacting the aqueous solution of sodium perchlorate formed in the first reacting zone with hydrogen chloride to produce aqueous perchloric acid and sodium chloride, recycling two moles of perchloric acid to the first reaction zone and recovering the remaining perchloric acid as product.

References Cited in the file of this patent

UNITED STATES PATENTS

| | | |
|---|---|---|
| 2,047,549 | Cunningham | July 14, 1936 |
| 2,287,061 | Osborne et al. | June 23, 1942 |
| 2,392,861 | Pernert | Jan. 15, 1946 |
| 2,489,571 | Hampel | Nov. 29, 1949 |

OTHER REFERENCES

Mellor's Supp. II, Part I (1956), "Comprehensive Treatise on Inorganic and Theoretical Chemistry," pages 522 and 569. Longmans, Green and Co., N.Y.

Mellor's "Comprehensive Treatise on Inorganic and Theoretical Chemistry," vol. 2, 1922, page 283.

Mellor's "Comprehensive Treatise on Inorganic and Theoretical Chemistry," Supplement II, Part I, Longmans, Green & Co., New York, N.Y., 1956, pages 556, 557 and 572.

Mellor: "Comprehensive Treatise on Inorganic and Theoretical Chemistry," vol. 2, pp. 297, 298 (1922).